(12) United States Patent
Zama et al.

(10) Patent No.: US 9,475,330 B2
(45) Date of Patent: Oct. 25, 2016

(54) PRINTING MEDIUM AND COMPOSITION FOR PRINTING MEDIUM

(71) Applicant: YUPO CORPORATION, Tokyo (JP)

(72) Inventors: Takahiro Zama, Ibaraki (JP); Yuta Iwasawa, Ibaraki (JP); Kazuyuki Kimura, Virginia, VA (US)

(73) Assignee: YUPO CORPORATION, Tokyo (JP)

( * ) Notice: Subject to any disclaimer, the term of this patent is extended or adjusted under 35 U.S.C. 154(b) by 0 days.

(21) Appl. No.: 14/731,415

(22) Filed: Jun. 5, 2015

(65) Prior Publication Data

US 2015/0266327 A1 Sep. 24, 2015

Related U.S. Application Data

(63) Continuation of application No. PCT/JP2013/007210, filed on Dec. 6, 2013.

(30) Foreign Application Priority Data

Dec. 7, 2012 (JP) .................................. 2012-268638

(51) Int. Cl.

| | |
|---|---|
| *B41M 5/00* | (2006.01) |
| *B41M 5/52* | (2006.01) |
| *C08L 75/04* | (2006.01) |
| *C09J 123/08* | (2006.01) |
| *C08L 23/08* | (2006.01) |
| *C09D 123/02* | (2006.01) |
| *C09D 133/02* | (2006.01) |
| *C09D 175/04* | (2006.01) |
| *C09D 123/08* | (2006.01) |
| *G03G 7/00* | (2006.01) |

(52) U.S. Cl.
CPC ............. *B41M 5/52* (2013.01); *B41M 5/5218* (2013.01); *B41M 5/5245* (2013.01); *B41M 5/5254* (2013.01); *B41M 5/5281* (2013.01); *C08L 23/0869* (2013.01); *C08L 75/04* (2013.01); *C09D 123/02* (2013.01); *C09D 123/0869* (2013.01); *C09D 133/02* (2013.01); *C09D 175/04* (2013.01); *C09J 123/0869* (2013.01); *G03G 7/002* (2013.01); *G03G 7/004* (2013.01); *G03G 7/0013* (2013.01); *G03G 7/0046* (2013.01); *Y10T 428/256* (2015.01); *Y10T 428/273* (2015.01); *Y10T 428/31551* (2015.04)

(58) Field of Classification Search
CPC .. B41M 5/50; B41M 5/5218; B41M 5/5254; B41M 5/5281
See application file for complete search history.

(56) References Cited

U.S. PATENT DOCUMENTS

| | | | | |
|---|---|---|---|---|
| 2007/0003716 A1* | 1/2007 | Suzuki | ................... | B41M 5/502 428/32.36 |
| 2007/0165091 A1* | 7/2007 | Oishi | ..................... | B41J 11/002 347/102 |
| 2009/0130309 A1* | 5/2009 | Kawakami | ............. | B41M 5/502 427/261 |
| 2011/0104411 A1 | 5/2011 | Oguri et al. | | |
| 2014/0106140 A1* | 4/2014 | Ikeda | ..................... | B41M 5/506 428/201 |

FOREIGN PATENT DOCUMENTS

| | | |
|---|---|---|
| EP | 2517890 A1 | 10/2012 |
| JP | 2001-287450 A | 10/2001 |
| JP | 2002-113959 A | 4/2002 |
| WO | WO 2012/133301 A1 * | 4/2012 |

\* cited by examiner

*Primary Examiner* — Betelhem Shewareged

(57) ABSTRACT

Provided is a composition for a printing medium and a printing medium that can be suitably used for a plurality of printing methods, including a plurality of plateless printing methods such as thermal transfer printing, electrophotographic printing, and inkjet printing methods. A coating layer is provided on at least one surface of a support body, and includes (a) a cationic urethane-based resin, (b) an olefin copolymer emulsion, and (c) an ethyleneimine-based resin. The solid mass of the coating layer on one surface of the support body may be 0.01-5 g/m$^2$.

11 Claims, No Drawings ically patent application
and PCT application are incorporated herein by reference:
NO. 2012-268638 filed on Dec. 7, 2012, and
NO. PCT/JP2013/007210 filed on Dec. 6, 2013.

BACKGROUND

1. Technical Field

The present invention relates to a composition for a printing medium, which is sometimes referred to as a printing medium composition, and a printing medium, and more specifically to a printing medium composition and a printing medium that are suitable for a plurality of printing methods.

2. Related Art

A printing medium, such as printing paper, is desired that has excellent suitability for printing using a plurality of printing methods. Therefore, there have been a variety of attempts to improve the structure and surface characteristics of printing media. For example, a printing medium is known that, as a result of devising a composition of a resin layer provided on a support body, has excellent printing suitability for a certain printing method, and also can be used for other printing methods, as shown in Patent Documents 1 to 4, for example.

PRIOR ART DOCUMENTS

Patent Documents

Patent Document 1: Japanese Patent Application Publication No. 2002-113959
Patent Document 2: Japanese Patent Application Publication No. 2001-287450
Patent Document 3: Japanese Patent Application Publication No. 2011-116125
Patent Document 4: Japanese Patent Application Publication No. 2011-131416

However, the conditions desired for the printing medium differ depending on the printing method. Therefore, it is difficult to simultaneously satisfy the conditions desired for a plurality of printing methods. In particular, it is extremely difficult to satisfy both the conditions desired for plate printing methods, such as offset printing and seal printing, and the conditions desired for plateless printing methods, such as thermal transfer printing, electrophotographic printing, and inkjet printing. Therefore, a printing medium that has excellent printing suitability for both plate printing methods and plateless printing methods and a composition that is especially suitable for surface processing on this printing medium are desired.

SUMMARY

According to a first aspect of the present invention, provided is a printing medium composition comprising (a) a cationic urethane-based resin, (b) an olefin copolymer emulsion, and (c) an ethyleneimine-based resin.

According to a second aspect of the present invention, provided is a printing medium comprising a support body and a coating layer that is provided on at least one surface of the support body and includes the printing medium composition described above.

The summary clause does not necessarily describe all necessary features of the embodiments of the present invention. The present invention may also be a sub-combination of the features described above.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

In the Specification, numerical ranges expressed using "-" include the values that precede and follow the "-" mark.

Furthermore, in the Specification, the phrase "includes A as a primary component" means that, in the composition including the component A, the content of the component A is greatest in terms of mass.

The printing medium includes a support body and a coating layer, which includes the printing medium composition and is provided on at least one surface of the support body. The printing medium composition includes at least (a) a cationic urethane-based resin, (b) an olefin copolymer emulsion, and (c) an ethyleneimine-based resin. By using a printing medium composition that includes (a) a cationic urethane-based resin, (b) an olefin copolymer emulsion, and (c) an ethyleneimine-based resin as the material of the coating layer of the printing medium, a printing medium is obtained that has excellent printing suitability for both plate printing methods and plateless printing methods. With the printing medium described above, it is also possible to print information or designs such as patterns on the same printing medium using different printing methods. For example, on the same printing medium, it is possible to use a plate printing method to print set data such as geometrical patterns or line patterns and a plateless printing method to record variable data such as a product name or monetary amount.

In the present embodiment, the printing medium is provided with a coating layer derived from the printing medium resin composition described above, on at least one surface of the support body.

<Printing Medium Composition>

The printing medium composition includes at least (a) a cationic urethane-based resin, (b) an olefin copolymer emulsion, and (c) an ethyleneimine-based resin. The printing medium, which is formed by providing the coating layer derived from the printing medium composition on at least one surface of the support body, has excellent printing suitability for both plate printing methods and plateless printing methods. In particular, the printing medium has excellent suitability for offset printing, which is a plate printing method, and either solvent inkjet printing or UV-curable inkjet printing, which are plateless printing methods.

When the primary component in the support body of the printing medium is resin, in a case where the printed material is printed using an inkjet method, bleeding of the ink in the printed material occurs easily due to insufficient absorption of the ink by the support body, and this makes it difficult to improve the printing quality.

On the other hand, in a case where a polarized resin that swells by absorbing ink on the surface of the support body is provided in order to improve the printing suitability for inkjet printing, it becomes easy for excessive emulsification of the ink due to water to occur when printing with an offset printing method due to the excessively hydrophilic property of the surface, and therefore it is difficult to improve the printing quality. However, by using the coating layer derived from the printing medium composition on the surface of the printing medium, not only is it possible to restrict bleeding of the ink when printing with an inkjet method, but it is also possible to restrict the occurrence of excessive emulsification due to water when printing with the offset method.

As a result, excellent printing suitability is realized for both the offset printing method and the inkjet printing method.

((a) Cationic Urethane-Based Resin)

The cationic urethane-based resin is predicted to function as a binder resin in the coating layer. The cationic urethane-based resin fixes, to the surface of the support body, particles derived from the emulsion of the olefin copolymer contained in the printing medium composition, and therefore it is predicted that printed material with excellent water resistance will be obtained. Furthermore, the ink used in inkjet printing is an anionic material, and therefore the cationic urethane-based resin further increases the cohesive force of the inkjet ink. As a result, it is predicted that the adhesion of the printed material will be further improved. In particular, even when using UV-curable ink, in which ink bleeding usually occurs easily, with a printing medium that has cationic urethane-based resin on the surface, it is predicted that this printing medium will have excellent printing suitability without bleeding.

In the Specification, the cationic urethane-based resin refers to a material obtained by introducing a cationic hydrophilic group into a urethane-based resin frame. The cationic urethane-based resin preferably has a ternary amine structure or a quaternary ammonium salt structure in the molecules, and more preferably has a quaternary ammonium structure in the molecules. This type of cationic urethane-based resin can refer to a urethane-based resin obtained by causing a reaction between polyisocyanate and a polyol including a ternary amino group obtained from a reaction between a secondary amine and a component including two epoxy groups in one molecule, or to a urethane-based resin obtained by causing a reaction between polyisocyanate and a polyol or diol including a diol with a quaternary ammonium salt structure in the molecules.

The compound including two epoxy groups in one molecule can be exemplified as a compound expressed by Formula 1 shown below.

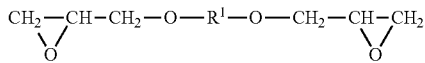

Formula 1

In this formula, $R^1$ represents an alkylene group, a dihydric phenol type residue, or a polyoxyalkylene group.

If $R^1$ is an alkylene group in Formula 1, the alkylene group may have an aliphatic structure in which carbon numbers 2-12 may branch, or may have an aliphatic cyclic structure for carbon numbers 6-16. If $R^1$ is an alkylene group, the compound expressed by Formula 1 can be exemplified by a 1,2-ethanediol diglycidyl ether, a 1,2-propanediol diglycidyl ether, a 1,3-propanediol diglycidyl ether, a 1,4-butanediol diglycidyl ether, a 1,5-pentanediol diglycidyl ether, a 3-methyl-1,5-pentanediol diglycidyl ether, a neopentyl glycol-diglycidyl ether, a 1,6-hexanediol diglycidyl ether, a polybutadiene-diglycidyl ether, a 1,4-cyclohexane diglycidyl ether, a diglycidyl ether of 2,2-bis(4-hydroxycyclohexyl)-propane (sometimes referred to as hydrogenated bisphenol A), or a diglycidyl ether of an isomer mixture of hydrogenated dihydroxy diphenyl methane (sometimes referred to as hydrogenated bisphenol F.)

If $R^1$ in Formula 1 is a dihydric phenol type residue, the compound expressed by Formula 1 can be exemplified by a resorcinol-diglycidyl ether, a hydroquinone-diglycidyl ether, a diglycidyl ether of 2,2-bis(4-hydroxyphenyl)-propane (sometimes referred to as bisphenol A diglycidyl ether), a diglycidyl ether of an isomeric mixture of dihydroxy diphenyl methane (sometimes referred to as bisphenol F), a diglycidyl ether of 4,4-dihydroxy-3-3'-dimethyl diphenyl propane, a diglycidyl ether of 4,4-dihydroxydiphenyl cyclohexane, a diglycidyl ether of 4,4-dihydroxydiphenyl, a diglycidyl ether of 4,4-dihydroxy benzophenone, a diglycidyl ether of bis (4-hydroxyphenyl)-1,1-ethane, a diglycidyl ether of bis (4-hydroxyphenyl)-1,1-isobutane, a diglycidyl ether of bis (4-hydroxy-3-t-butylphenyl)-2,2-propane, a diglycidyl ether of bis (2-hydroxy naphthyl) methane, and a diglycidyl ether of bis (4-hydroxyphenyl) sulfone (sometimes referred to as bisphenol-S).

If $R^1$ in Formula 1 is a polyoxyalkylene group, the compound expressed by Formula 1 can be exemplified by diethylene glycol-diglycidyl ether, dipropylene glycol-diglycidyl ether, and polyoxyalkylene glycol-diglycidyl ether in which the number of repetitions of oxyalkylene units is 3-60. This polyoxyalkylene glycol-diglycidyl ether can be exemplified by polyoxyethylene glycol-diglycidyl ether and polyoxypropylene glycol-diglycidyl ether, diglycidyl ether of an ethylene oxide-propylene oxide copolymer, and polyoxytetraethylene glycol-diglycidyl ether.

The secondary amine is not particularly limited, but it is preferable to use an aliphatic secondary amine that is branched or linear. By using a branched or linear aliphatic secondary amine, it is easy to control the reaction between the secondary amine and the compound including two epoxy groups in one molecule.

This type of secondary amine can be exemplified by dimethylamine, diethylamine, di-n-propylamine, diisopropylamine, di-n-butylamine, di-t-butyl amine, di-sec-butylamine, di-n-pentylamine, di-n-heptylamine, di-n-octylamine, di-iso-octylamine, dinonylamine, diisononyl amine, di-n-decylamine, di-n-undecyl amine, di-n-dodecylamine, di-n-pentadecyl amine, di-n-octadecylamine, di-n-nonadecylamine, or di-n-eicosyl amine.

Among these amines, it is preferable to use a secondary aliphatic amine with a carbon number of 2-18, and more preferable to use a secondary aliphatic with a carbon number of 3-8. These aliphatic secondary amines are not likely to be volatile when manufacturing the polyol containing the ternary amino group, and therefore it is easy to control the reaction. Furthermore, it is possible to reduce steric hindrance when neutralizing at least a portion of the third amine group with acid and performing quaternization with a quaternizing agent.

The polyisocyanate is not particularly limited, and organic polyisocyanate that is used in the manufacturing of normal urethane-based resin may be used. The organic polyisocyanate may be aromatic polyisocyanate, alicyclic polyisocyanate, or aliphatic polyisocyanate.

The cationic urethane-based resin obtained as a result of the above preferably has a structural unit expressed by Formula 2 shown below in the molecules.

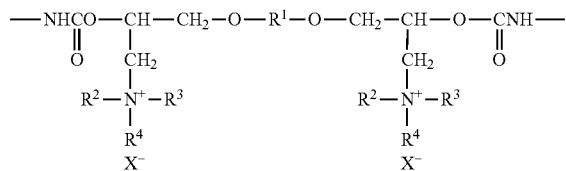

In this formula, $R^1$ represents an alkylene group, a dihydric phenol type residue, or a polyoxyalkylene group, $R^2$ and $R^3$ represent alkyl groups that are independent from each other and may include aliphatic cyclic structures, $R^4$ represents the organic residue of the quaternizing agent that is introduced by the quaternization reaction or hydrogen atoms, and $X^-$ represents an anionic counterion.

In Formula 2, $X^-$ can be exemplified by chloride ions, bromide ions, iodide ions, nitrate ions, sulfate ions, methyl sulfate ions, methyl carbonate ions, aliphatic or aromatic carboxylic acid ions with a carbon number of 1-12, or aliphatic or aromatic sulfonic acid ions with a carbon number of 1-12.

On the other hand, the diol having the quaternary ammonium salt structure in the molecules can be exemplified by the compound expressed by Formula 3 or Formula 4.

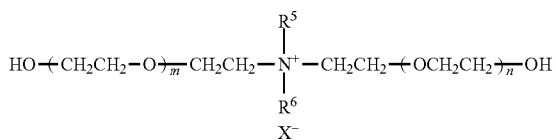

In this formula, $R^5$ and $R^6$ represent alkyl groups that may be independent from each other and may include aliphatic cyclic structures, $X^-$ represents an anionic counterion, and m and n are each an integer of 0-50.

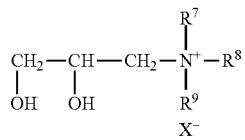

In this formula, $R^7$, $R^8$, and $R^9$ represent alkyl groups that may be independent from each other and may include aliphatic cyclic structures, and $X^-$ represents an anionic counterion.

In Formula 3, it is preferable that $R^5$ and $R^6$ are straight-chain alkyl groups with carbon numbers of 1-12 independently, it is more preferable that one of $R^5$ and $R^6$ is a straight-chain alkyl group with a carbon number of 1-12 while the other is a straight chain alkyl group with a carbon number of 1-3, and it is even more preferable that $R^5$ and $R^6$ are both straight-chain alkyl groups with a carbon number of 1-3.

In Formula 3, $X^-$ can be exemplified by chloride ions, bromide ions, iodide ions, nitrate ions, sulfate ions, methyl sulfate ions, methyl carbonate ions, aliphatic or aromatic carboxylate ions with a carbon number of 1-12, or aliphatic or aromatic sulfonic acid ions with a carbon number of 1-12.

The compound expressed in Formula 3 can be exemplified by dimethyl bis (2-hydroxyethyl) ammonium chloride or dimethyl bis (2-hydroxyethyl oxyethyl) ammonium chloride.

In Formula 4, it is preferable that $R^7$ to $R^9$ are straight-chain alkyl groups with carbon numbers of 1-12 that are independent from each other, it is more preferable that two of $R^7$ to $R^9$ are straight-chain alkyl groups with carbon numbers of 1-12 while the remaining one is a straight chain alkyl group with a carbon number of 1-3, and it is even more preferable that one of $R^7$ to $R^9$ is a straight-chain alkyl group with a carbon number of 1-12 while the remaining two are straight-chain alkyl groups with carbon numbers of 1-3.

In Formula 4, $X^-$ can be exemplified by chloride ions, bromide ions, iodide ions, nitrate ions, sulfate ions, methyl sulfate ions, methyl carbonate ions, aliphatic or aromatic carboxylate ions with a carbon number of 1-12, or aliphatic or aromatic sulfonic acid ions with a carbon number of 1-12.

The compound expressed in Formula 4 can be exemplified by 2,3-dihydroxypropyl-dodecyl dimethyl ammonium chloride.

The cationic urethane-based resin is preferably dispersed in an aqueous medium to realize an emulsion state. By using the cationic urethane-based resin in the emulsion state, which is sometimes referred to as the cationic urethane-based resin emulsion, it is easy to adjust the printing medium composition that coats the support body.

Superflex 600, 610, 620, or 650 (product names) manufactured by DSK Co., Ltd.; HYDRAN CP-7030, 7050, or 7060 (product name) manufactured by DIC Corporation; ADEKA BONTIGHTER HUX-680 manufactured by ADEKA Corporation; and Neo sticker manufactured by NICCA Chemical Co., Ltd. are sold commercially and can be used as the cationic urethane-based resin.

((b) Olefin Copolymer Emulsion)

The olefin copolymer emulsion realizes hydrophobicity in the coating layer and prevents excessive moisture from penetrating into the coating layer, and therefore it is predicted that excessive emulsification of the ink due to water during offset printing will be restricted and that stability over time will be provided for the printed material for the same reason. On the other hand, for printing methods that use heat, such as thermal transfer printing and electrophotographic printing, the olefin copolymer particles remaining on the surface of the printing medium are partially fused and are compatible with the thermal transfer ink or the toner, and therefore it is expected that the thermal transfer ink or the toner will be secured.

The olefin copolymer can be exemplified by an ethylene-(meth) acrylic acid copolymer, alkali (earth) metal salts of an ethylene-(meth) acrylic acid copolymer, an ethylene-(meth) acrylic acid ester-maleic anhydride copolymer, (meth) acrylic acid grafted polyethylene, maleic anhydride grafted polyethylene, a maleic anhydride grafted ethylene-vinyl acetate copolymer, a maleic anhydride grafted (meth) acrylic acid ester-ethylene copolymer, a maleic anhydride grafted polypropylene, a maleic anhydride grafted ethylene-propylene copolymer, a maleic anhydride grafted ethylene-propylene-butene copolymer, a maleic anhydride grafted ethylene-butene copolymer, or a maleic anhydride grafted propylene-butene copolymer.

The olefin copolymer is preferably an olefin copolymer with a melting point or softening point less than or equal to 130° C., and is more preferably an ethylene-(meth) acrylic acid copolymer, an ethylene-(meth) acrylic acid ester-maleic anhydride copolymer, a maleic anhydride grafted ethylene-vinyl acetate copolymer, a maleic anhydride grafted (meth)

acrylic acid ester-ethylene copolymer, a maleic anhydride grafted ethylene-propylene-butene copolymer, a maleic anhydride grafted ethylene-butene copolymer, or a maleic anhydride grafted propylene-butene copolymer. By using this type of olefin copolymer, it is possible to improve the receptivity.

At least one type of material selected from the group consisting of a non-ionic surfactant, a non-ionic water-soluble polymer, a cationic surfactant, and a cationic water-soluble polymer can be used as the dispersant for dispersing the olefin copolymer in water to form the emulsion.

The non-ionic surfactant can be exemplified by a polyoxyethylene alkyl ether, polyoxyethylene alkyl allyl ether, a polyoxyethylene oxypropylene block polymer, a polyethylene glycol fatty acid ester, or a polyoxyethylene sorbitan fatty acid ester.

The non-ionic water-soluble polymer can be exemplified by completely saponified polyvinyl alcohol, partially saponified polyvinyl alcohol, or modified versions thereof. Hydroxyethyl cellulose can be another example of the non-ionic water-soluble polymer.

The cationic surfactant can be exemplified by stearylamine hydrochloride, lauryl trimethyl ammonium chloride, or trimethyl octadecyl ammonium chloride.

The cationic water-soluble polymer can be exemplified by a polymer having a quaternary ammonium salt structure or a phosphonium salt structure, a nitrogen-containing (meth) acrylic polymer, or a (meth) acrylic polymer having nitrogen with a quaternary ammonium salt structure. The cationic water-soluble polymer is preferably a nitrogen-containing (meth) acrylic polymer, or a (meth) acrylic polymer having nitrogen with a quaternary ammonium salt structure. In this way, the adhesion to the thermoplastic resin film can be further improved.

The method for dispersing the olefin copolymer in water using the dispersant to obtain the emulsion is not particularly limited, and can be a method that includes mixing an emulsifier (surfactant) and a monomer forming the olefin copolymer with a dispersion medium such as water or an organic solvent, and then adding a polymerization initiator to the resulting mixture to perform emulsion polymerization; a method that includes thermally dissolving the olefin copolymer with an aromatic hydrocarbon dissolvent, stirring and mixing in the dispersant, and then causing a phase transition while adding water, after which the aromatic hydrocarbon dissolvent is removed to obtain the aqueous dispersion; and a method that includes supplying the olefin copolymer to a hopper of a twin-screw extruder, performing melt kneading by adding an aqueous solution of the dispersant in the thermally melted state, and causing a phase transition by then adding water to obtain the dispersion solution, such as described in Japanese Examined Patent Application Publication No. S62-29447. In particular, when the dispersant is a cationic water-soluble polymer, by using the method disclosed in Japanese Examined Patent Application Publication No. S62-29447, it is possible to easily adjust the average particle diameter of the resin particles in the aqueous dispersion.

The volume average particle diameter of the resin particles included in (b) the olefin copolymer emulsion is preferably 0.1-3 μm. The volume average particle diameter of these resin particles is more preferably greater than or equal to 0.2 μm, and even more preferably greater than or equal to 0.3 μm. On the other hand, this volume average particle diameter is more preferably less than or equal to 1 μm, even more preferably less than or equal to 0.72 μm, and most preferably less than or equal to 0.6 μm.

Aquatex AC-3100, EC-1200, or MC-4400 (product name) manufactured by JCR Co., Ltd. or chemipearl 5100, 5200, 5300, or SA100 (product name) manufactured by Mitsui Chemicals, Inc. are sold commercially and can be used as the olefin copolymer emulsion.

((c) Ethyleneimine-Based Resin)

The ethyleneimine-based resin has a strong affinity for various types of printing ink, and it is therefore predicted that the adhesion between the resin and the ink will be improved. As a result, it is predicted that there will be excellent printing suitability even when using inkjet printing with UV-curable ink, which often causes bleeding, or offset printing with UV-curable ink, which often causes peeling.

The ethyleneimine-based resin can be exemplified by polyethyleneimine, poly (ethyleneimine-urea), or an ethyleneimine adduct of polyamine polyamide, those which include an alkyl-modified product, a cyclo-alkyl modified product, an aryl modified product, an allyl modified product, an aralkyl-modified product, a benzyl modified product, a cyclopentyl modified product, an aliphatic cyclic hydrocarbon modified product, or a hydroxide. The exemplary ethyleneimine copolymers may be used individually, or a plurality of types of copolymers may be combined.

The ethyleneimine-based resin is preferably a modified product of a polyethyleneimine or an ethyleneimine adduct of polyamine polyamide, which is modified using, as a modifying agent, alkenyl halide, cycloalkyl halide, benzyl halide, dimethyl sulfate, or alkyl halide with a carbon number of 1-24. In this way, the adhesion with ink can be further improved.

The halide used as the modifying agent can be exemplified by methyl chloride, methyl bromide, n-butyl chloride, lauryl chloride, stearyl iodide, oleyl chloride, cyclohexyl chloride, benzyl chloride, allyl chloride, or cyclopentyl chloride.

Epomin (product name) manufactured by NIPPON SHOKUBAI Co., Ltd., Polymin SK (product name) manufactured by BASF SE, and Saftomer AC-72 or AC-2000 (product name) manufactured by Mitsubishi Chemical Corporation are sold commercially and can be used as the ethyleneimine-based resin.

(Quantity Ratios)

The quantity ratio (distribution ratio) of each component in the printing medium composition, as dry solid content, is adjusted to be the distribution ratios shown below, and therefore the printing medium enables balanced compatibility for a plurality of types of plate printing methods and plateless printing methods and can also exhibit excellent printing quality and hydrophilic properties.

The amount of (b) the olefin copolymer emulsion relative to 100 pts. mass of (a) the cationic urethane-based resin in the printing medium composition is preferably greater than or equal to 10 pts. mass, more preferably greater than or equal to 20 pts. mass, even more preferably greater than or equal to 50 pts. mass, and most preferably greater than or equal to 70 pts. mass, and is also preferably less than or equal to 400 pts. mass, more preferably less than or equal to 300 pts. mass, even more preferably less than or equal to 180 pts. mass, and most preferably less than or equal to 120 pts. mass.

On the other hand, the amount of (c) the ethyleneimine-based resin relative to 100 pts. mass of (a) the cationic urethane-based resin in the printing medium composition is preferably greater than or equal to 1 pts. mass, more preferably greater than or equal to 10 pts. mass, and even more preferably greater than or equal to 20 pts. mass, and is also preferably less than or equal to 60 pts. mass, more preferably less than or equal to 50 pts. mass, and more preferably less than or equal to 40 pts. mass.

In a printing medium where the coating layer derived from the printing medium composition is provided on at least one surface of the support body, the quantity ratio of each component in the coating layer is preferably unchanged from the quantity ratio (as a dry solid) of each component in the printing medium composition.

((d) Antistatic Agent)

The coating layer of the printing medium can also include (d) an antistatic agent. This coating layer is preferably obtained through a method that includes distributing the antistatic agent in the printing medium composition and coating at least one surface of the support body with the printing medium composition in which the antistatic agent has been distributed.

By including the antistatic agent in the coating layer, dust is prevented from attaching to the printing medium. Furthermore, trouble caused by static electricity during printing is reduced. The antistatic agent is not particularly limited, and cationic, anionic, amphoteric, or non-ionic types of antistatic agents can be used.

The cationic antistatic agent can be exemplified by an antistatic agent having an ammonium salt structure or phosphonium salt structure.

The anionic antistatic agent can be exemplified by an antistatic agent having an alkali metal salt structure, e.g. sulfonic acid, phosphoric acid, or carboxylic acid structure, which can be exemplified by a lithium salt, sodium salt, or potassium salt structure. The anionic antistatic agent may be an antistatic agent having an alkali metal salt structure, e.g. acrylic acid, methacrylic acid, or maleic acid (anhydride) structure, in the molecule structure.

The amphoteric antistatic agent can be exemplified by an antistatic agent having both a structure of a cationic functional group and an anionic functional group in the same molecule. The amphoteric antistatic agent may be a betaine antistatic agent.

The non-ionic antistatic agent can be exemplified by an ethylene oxide polymer having an alkylene oxide structure or a polymer having an ethylene oxide polymerization component in the molecular chain.

Other types of antistatic agents that can be used include a polymer antistatic agent that includes boron in the molecular structure.

A low molecular antistatic agent may be used as the antistatic agent, but in consideration of stability of the printing suitability over time, it is preferable to use a high molecular antistatic agent, it is more preferable to use a polymer antistatic agent that includes nitrogen, and it is even more preferable to use an acrylic resin, also known as an acrylic-based resin, that includes ternary nitrogen or quaternary nitrogen.

The added amount of the antistatic agent relative to 100 pts. mass of (a) the cationic urethane-based resin is preferably greater than or equal to 1 pts. mass and more preferably greater than or equal to 4 pts. mass, and is also preferably less than or equal to 30 pts. mass and more preferably less than or equal to 20 pts. mass.

((e) Cross-Linking Agent)

The coating layer of the printing medium can further include (e) a cross-linking agent. This coating layer is preferably obtained through a method that includes distributing the cross-linking agent in the printing medium composition and coating at least one surface of the support body with the printing medium composition in which the cross-linking agent has been distributed.

By including the cross-linking agent in the coating layer, cross-linking with the ethyleneimine-based resin is realized to improve the water resistance of the coating layer. The cross-linking agent is not particularly limited, and epoxy, halohydrin, isocyanate, formaldehyde, or oxazoline types of water-soluble resin can be used. The cross-linking agent can be exemplified by bisphenol A-epichlorohydrin resin, epichlorohydrin resin of polyamine polyamide, aliphatic epoxy resin, epoxy novolac resin, cycloaliphatic epoxy resin, or brominated epoxy resin. The cross-linking agent is preferably an epoxy type or halohydrin type, more preferably an epichlorohydrin additive of polyamine polyamide or a glycidyl ether or glycidyl ester of a monofunctional or polyfunctional group, and even more preferably an epichlorohydrin additive of polyamine polyamide.

The added amount of the cross-linking agent relative to 100 pts. mass of (a) the cationic urethane-based resin is preferably greater than or equal to 1 pts. mass and more preferably greater than or equal to 4 pts. mass, and is also preferably less than or equal to 30 pts. mass and more preferably less than or equal to 20 pts. mass.

<Support Body>

The support body provides strength (stiffness) to the printing medium. The material of the support body is not particularly limited, as long as the material has a strength (stiffness) corresponding to the intended use of the printing medium. The material of the support body can be exemplified by pulp paper, resin-laminated paper, metallized paper, non-woven fabric, or resin film.

[Film Layer Including Thermoplastic Resin]

The material of the support body may include a film layer having a thermoplastic resin. By using a film layer having thermoplastic resin as the material for the support body, the printed material can be provided with water resistance. The thermoplastic resin included in the film layer may include additives such as inorganic particles, organic fillers, thermal stabilizers (antioxidants), light stabilizers, dispersants, and lubricant. The content of the resin component relative to the entire film layer of the support body is set such that the support body can easily provide suitable strength, water resistance, and the like, and is greater than or equal to 25% mass, preferably greater than or equal to 30% mass, more preferably greater than or equal to 35% mass, and most preferably greater than or equal to 45% mass. On the other hand, the content of the resin component relative to the entire film layer of the support body is less than or equal to 100% mass, preferably less than or equal to 95% mass, more preferably less than or equal to 92% mass, and most preferably less than or equal to 90% mass.

(Thermoplastic Resin)

The thermoplastic resin included in the film layer can be exemplified by any resin or combination of resins selected from a group consisting of polyolefin-based resin such as ethylene-based resin (which can be exemplified by high-density polyethylene or medium-density polyethylene), propylene-based resin, polymethyl-1-pentene, and ethylene-cyclic olefin copolymer; polyamide-based resin such as nylon-6 and nylon-6,6; thermoplastic polyester-based resin such as aromatic polyester (which can be exemplified by polyethylene terephthalate and its copolymer, polyethylene naphthalate, or polybutylene terephthalate) or aliphatic polyester (which can be exemplified by polybutylene succinate, polybutylene adipate, or polylactic acid); and thermoplastic resin such as polycarbonate, atactic polystyrene, or syndiotactic polystyrene.

The thermoplastic resin included in the film layer may be a polyolefin-based resin or a resin that includes a polyolefin-based resin as a primary component. By using such a resin as the thermoplastic resin included in the film layer, the printing medium with excellent water resistance and chemical resistance can be manufactured at a low cost.

The polyolefin-based resin may be a propylene-based resin. By using a propylene-based resin, the printing medium can be provided with suitable strength (stiffness). The propylene-based resin may be a copolymer with propylene as the primary component and α-olefin such as ethylene, 1-butene, 1-hexene, 1-heptene, or 4-methyl-1-pentene. The copolymer may be a binary copolymer or a multi-component copolymer that is ternary or higher. The copolymer may be a random copolymer or a block copolymer.

The stereoregularity of the propylene-based resin is not particularly limited. It is possible to use a propylene-based resin that exhibits various degrees of tacticity such as isotactic or syndiotactic. The propylene-based resin preferably contains a resin with a lower melting point than a propylene homopolymer, in a range of 2-25% mass. The resin with a lower melting point than a propylene homopolymer can be exemplified by high-density polyethylene or low-density polyethylene.

(Inorganic Particles)

The thermoplastic resin may further include inorganic particles. In this way, it is possible to make the support body white or opaque, and the support body can be provided with a concealing property. As a result, it is possible to improve the visibility of the printed content. Furthermore, it is possible to prevent the printed content from being visible through the back surface of the printing medium.

The inorganic particles can be exemplified by particles of heavy calcium carbonate, light calcium carbonate, calcined clay, talc, diatomaceous earth, titanium oxide, barium sulfate, alumina, silica, zinc oxide, or magnesium oxide. The inorganic particles may undergo surface processing using a surface processing agent. The surface processing may use one type of surface processing agent, or may use two or more types of surface processing agents.

The inorganic particles may be particles of heavy calcium carbonate or precipitated calcium carbonate or surface-processed products thereof, or may be particles of clay or diatomaceous earth. By using these particles as the inorganic particles, it is possible to improve hole formation when stretching the film layer that includes the thermoplastic resin. Furthermore, it is possible to decrease the manufacturing cost of the printing medium.

The surface processing agent for the inorganic particles can be exemplified by fatty acid, organic acid, a sulfuric ester anionic surfactant, a sulfonate anionic surfactant, or resin acid, petroleum resin acid, or salts thereof (which can be exemplified by sodium salt, potassium salt, or ammonium salt). Other examples of the surface processing agent for the inorganic particles include a diene polymer, a non-ionic surfactant, inert inorganic oxide, a titanate coupling agent, a silane coupling agent, a phosphate coupling agent, a fatty acid ester, a resin acid ester, wax, and paraffin.

The fatty acid can be exemplified by caproic acid, caprylic acid, pelargonic acid, capric acid, undecanoic acid, lauric acid, myristic acid, palmitic acid, stearic acid, heben acid, oleic acid, linoleic acid, linolenic acid, or eleostearic acid.

The organic acid can be exemplified by maleic acid or sorbic acid.

The sulfuric ester anionic surfactant can be exemplified by a long-chain alcohol sulfuric ester or polyoxyethylene alkyl ether sulfate, or sulfated oil or salt thereof.

The sulfonate anionic surfactant can be exemplified by alkylbenzene sulfonic acid, alkylnaphthalene sulfonic acid, paraffin sulfonic acid, α-olefin sulfonate or alkyl sulfosuccinic acid, or salt thereof.

The diene polymer can be exemplified by polybutadiene or isoprene.

The nonionic surfactant can be exemplified by a polyethylene glycol ester surfactant.

The inert inorganic oxide can be exemplified by alumina or silica.

The surface processing method used for the inorganic particles is not particularly limited. The inorganic particles may undergo surface processing according to the method described in any of Japanese Patent Application Publication No. H5-43815, Japanese Patent Application Publication No. H5-139728, Japanese Patent Application Publication No. H7-300568, Japanese Patent Application Publication No. H10-176079, Japanese Patent Application Publication No. H11-256144, Japanese Patent Application Publication No. H11-349846, Japanese Patent Application Publication No. 2001-158863, Japanese Patent Application Publication No. 2002-220547, Japanese Patent Application Publication No. 2002-363443, and Japanese Patent Application Publication No. 2010-66512.

(Organic Filler)

The film layer including the thermoplastic resin may also include an organic filler. In this way, it is possible to make the support body white or opaque, and the support body can be provided with a concealing property. As a result, it is possible to improve the visibility of the printed content. Furthermore, it is possible to prevent the printed content from being visible through the back surface of the printing medium.

The organic filler is preferably a resin with a melting point or glass transition point that is higher than the melting point or glass transition point of the thermoplastic resin that is the primary component of the film layer. Furthermore, the difference between the melting point or glass transition point of the resin forming the organic filler and the melting point or glass transition point of the thermoplastic resin that is the primary component of the film layer is preferably in a range of 120-300° C. The organic filler is incompatible with the thermoplastic resin that is the primary component of the film layer, and therefore it is possible to improve the hole formation when stretching the film layer including the thermoplastic resin.

In addition, the hole formation can be further improved by stretching the film layer at a temperature that is higher than the glass transition point of the thermoplastic resin that is the primary component of the film layer and lower than the glass transition point of the resin forming the organic filler.

Furthermore, the resin forming the organic filler is preferably cross-linked.

When using a propylene-based resin as the thermoplastic resin that is the primary component of the film layer, preferable materials for the organic filler can be exemplified by polyethylene terephthalate, polyethylene naphthalate, polybutylene terephthalate, polyamide, polycarbonate, polystyrene, a cyclic olefin homopolymer, an ethylene-cyclic olefin copolymer, polyethylene sulfide, polyimide, polymethacrylate, polyethyl ether ketone, polyphenylene sulfide, or a melamine resin.

(Sizes of the Inorganic Particles and Organic Filler)

The average particle diameter of the inorganic particles and the average dispersed particle diameter of the organic filler tend to make it easy to obtain holes through the stretching of the film layer and to make it easy to realize opaqueness of the printing medium, and are therefore preferably greater than or equal to 0.01 µm, more preferably greater than or equal to 0.05 µm, and even more preferably greater than or equal to 0.1 µm. On the other hand, since there is a trend not to decrease the strength of the film layer, these particle diameters are preferably less than or equal to 15 µm, more preferably less than or equal to 2 µm, and even more preferably less than or equal to 1.3 µm.

The average particle diameter of the inorganic particles can be measured by observing the primary particle diameter for each of 100 inorganic particles in a cross-sectional plane of the film layer using an scanning electron microscope, and calculating the average value of the primary particle diameters of these 100 inorganic particles. The primary particle diameter is determined from the maximum diameter, i.e. the maximum value of the distance between two points on the outline of a particle.

The average dispersed particle diameter of the organic filler can be measured by observing the dispersed particle diameter for each of 100 organic filler particles in a cross-sectional plane of the film layer using an scanning electron microscope, and calculating the average value of the dispersed particle diameters of these 100 organic filler particles. The dispersed particle diameter is determined from the maximum diameter, i.e. the maximum value of the distance between two points on the outline of a particle.

(Added Amount of the Inorganic Particles and Organic Filler)

The thermoplastic film included in the film layer may include a single type of inorganic particle, or may include two or more types of inorganic particles. The thermoplastic resin described above may include a single type of organic filler, or may include two or more types of organic fillers. The thermoplastic resin described above may include one or more types of inorganic particles and one or more types of organic fillers.

In a case where the thermoplastic resin includes at least one of the inorganic particles and the organic filler, the distribution ratio of the total amount of the inorganic particles and the organic filler relative to the total mass of the thermoplastic resin (sometimes referred to as the thermoplastic resin composition mass) that includes the other additives shown below tends to make it easy for holes to be obtained by the stretching of the film layer and to make it easy to realize opaqueness for the printing medium, and therefore this distribution ratio is preferably greater than or equal to 5% mass, more preferably greater than or equal to 8% mass, and even more preferably greater than or equal to 10% mass. On the other hand, the distribution ratio of the total amount of the inorganic particles and the organic filler tends to make it difficult to reduce the strength of the film layer, and therefore this distribution ratio is preferably less than or equal to 75% mass, more preferably less than or equal to 65% mass, and even more preferably less than or equal to 55% mass.

(Other Additives)

A thermal stabilizer can be exemplified by a hindered phenolic antioxidant, a phosphorus antioxidant, or an amine antioxidant. The added amount of the thermal stabilizer is preferably 0.001-1% mass relative to the thermoplastic resin composition mass.

A light stabilizer can be exemplified by a hindered amine light stabilizer, a benzotriazole light stabilizer, a benzophenone light stabilizer, or a sulfur light stabilizer. The added amount of the light stabilizer is preferably 0.001-1% mass relative to the thermoplastic resin composition mass.

The dispersant is used in order to disperse the inorganic particles in the film layer that includes the thermoplastic resin, for example. The dispersant can be exemplified by a silane coupling agent, oleic acid, a higher fatty acid such as stearic acid, metal soap, polyacrylic acid, polymethacrylic acid, or a salt of any of these materials. The added amount of the dispersant is preferably 0.01-4% mass relative to the thermoplastic resin composition mass.

(Method for Forming the Film Layer that Includes the Thermoplastic Resin)

The method for forming the film layer that includes the thermoplastic resin is not particularly limited. For example, the film layer that includes the thermoplastic resin can be formed using calendar molding, rolling molding, inflation molding, or cast molding that include pressing the melted resin into a sheet shape using a single-layer or multi-layer T die or I die connected to a screw extruder. After subjecting the mixture that includes the thermoplastic resin and an organic solvent or oil to cast molding or calendar molding, the film layer including the thermoplastic resin may be formed using a method that includes removing the solvent or oil.

The film layer including the thermoplastic resin may be a film layer that is not stretched or a film layer that is stretched. The method for stretching the film layer is not particularly limited. For example, the film layer can be stretched by using longitudinal stretching that utilizes a peripheral speed difference between rollers, transverse stretching that utilizes a tenter oven, rolling stretching, simultaneous biaxial stretching by a combination of a tenter oven and a linear motor, simultaneous biaxial stretching by a combination of a tenter oven and a pantograph, or a combination of any of these methods.

The stretching of the film layer is preferably performed within a temperature range suitable for the thermoplastic resin included in the film layer. In a case where the thermoplastic resin used for the film layer is an amorphous resin, the stretching temperature of the film layer is preferably in a temperature range that is greater than or equal to the glass transition temperature of the thermoplastic resin. Furthermore, in a case where the thermoplastic resin used for the film layer is a crystalline resin, the stretching temperature of the film layer is preferably in a temperature range that is greater than or equal to the glass transition temperature of the amorphous portion of the thermoplastic resin and less than or equal to the melting point of the crystalline portion of the thermoplastic resin. Specifically, the stretching temperature of the film layer is preferably 2-60° C. lower than the melting point of the thermoplastic resin used in the film layer.

In a case where the thermoplastic resin used in the film layer is a propylene homopolymer (melting point of 155-167° C.), the stretching temperature of the film layer is preferably in a range of 152-164° C. In a case where the thermoplastic resin used in the film layer is high-density polyethylene (melting point of 121-134° C.), the stretching temperature of the film layer is preferably in a range of 110-120° C. In a case where the thermoplastic resin used in the film layer is polyethylene terephthalate (melting point of 246-252° C.), the stretching temperature of the film layer is preferably in a range of 104-115° C.

The stretching speed is not particularly limited, and is preferably in a range of 20-350 m/min. The stretching ratio is not particularly limited, and is set as desired in consideration of the characteristics of the thermoplastic resin used in the film layer. For example, the stretching ratio when stretching in one direction is approximately 1.2-12 times and preferably 2-10 times, and the stretching ratio when stretching on two axes is 1.5-60 times and preferably 10-50 times. In a case where a thermoplastic resin that is not a propylene homopolymer or copolymer is used, the stretching ratio when stretching in one direction is approximately 1.2-10 times and preferably 2-5 times per area magnification, and the stretching ratio when stretching on two axes is 1.5-20 times and preferably 4-12 times.

(Properties of the Film Layer Including the Thermoplastic Resin)

The thickness of the film layer including the thermoplastic resin is preferably in a range of 30-500 µm, more preferably in a range of 40-400 µm, and even more preferably in a range of 50-300 µm.

When the thermoplastic resin including at least one of the inorganic particles and the organic filler is stretched, a porous resin stretched film having a large number of tiny holes (sometimes referred to as the "stretched thermoplastic resin") is obtained. By using the porous resin stretched film as the support body of the printing medium, a printing medium is obtained that excels at being both lightweight and opaque. The density of the stretched thermoplastic resin film is preferably in a range of 0.65-1.2 g/cm$^3$ and more preferably in a range of 0.7-1 g/cm$^3$.

The porosity of the stretched thermoplastic resin film, as defined by Expression 1 shown below, is preferably in a range of 5-60% and more preferably in a range of 10-50%.

Expression 1

$$\frac{\rho 0 - \rho 1}{\rho 0} \times 100 \quad (1)$$

$\rho 0$ ...TRUE DENSITY OF THE THERMOPLASTIC RESIN FILM
$\rho 1$ ...DENSITY OF THE THERMOPLASTIC RESIN FILM The opacity of the stretched thermoplastic resin film is preferably greater than or equal to 50% and more preferably greater than or equal to 60%. If the opacity of the support body of the stretched thermoplastic resin film is greater than or equal to 50%, the visibility of the printed content is improved by using this support body as the printing medium. Furthermore, the printed content is prevented from being seen from the back side of the printing medium. As a result, when printing a barcode using the printing medium as label paper, for example, errors occurring when reading the printed barcode can be restricted.

The whiteness of the stretched thermoplastic resin film is preferably greater than or equal to 80%, and more preferably greater than or equal to 90%. If the whiteness of the support body using the stretched thermoplastic resin film is greater than or equal to 80%, the vividness of the printed material can be improved.

(Structure of the Support Body)

The support body may be a single layer or may have a multi-layer structure.

For example, by stretching a single-layer resin film, which is formed from a resin composition containing 40-99.5% mass of polyolefin-based resin and 60-0.5% mass of inorganic particles, on one axis or two axes at a stretching temperature that is less than the melting point of the polyolefin-based resin that is the primary component, it is possible to adjust the support body made from the single-layer polyolefin-based resin film. The stretching temperature is preferably 3-60° C. less than the melting point of the polyolefin-based resin.

On the other hand, by having one stage that includes obtaining a stretched film that has been stretched in the MD direction by stretching a resin film that is formed from a resin composition containing 40-100% mass of polyolefin-based resin and 60-0% mass of inorganic particles in the machine direction (MD direction) at a stretching temperature that is less than the melting point of the polyolefin-based resin that is the primary component, and another stage that includes obtaining a layered film by laminating a resin film made from a resin composition containing 25-100% mass of polyolefin-based resin and 75-0% mass of inorganic particles on at least one surface of the stretched resin film, it is possible to adjust the support body with a multi-layer structure formed from a plurality of polyolefin-based resin films. At this time, the composition of each of the polyolefin-based resin films forming the laminate may be the same or may be different, and the compositions may be adjusted to provide a function for each layer.

The stage of obtaining the layered film may include a stage of stretching the resin film formed of a resin composition including 25-100% mass of polyolefin-based resin and 75-0% mass of inorganic particles in the transverse direction (TD direction) at a temperature lower than the melting point of this polyolefin-based resin to obtain a stretched film that is stretched in the TD direction and a stage of layering the stretched film that has been stretched in the TD direction on a stretched film that has been stretched in the MD direction to obtain the layered film. The stretching temperatures at the stage of obtaining the stretched film that has been stretched in the MD direction and at the stage of obtaining the stretched film that has been stretched in the TD direction are preferably each a temperature that is 3-60° C. less than the melting point of the polyolefin-based resin.

<Coating Layer>

The coating layer is provided on at least one surface of the support body and includes at least (a) the cationic urethane-based resin, (b) the olefin copolymer emulsion, and (c) the material derived from the printing medium composition containing the ethyleneimine-based resin.

(Coating Layer Formation Method)

The method for forming the coating layer is not particularly limited, but the coating layer is preferably formed using a method that includes a stage of adjusting the printing medium composition by dissolving in a solvent the component described above that forms the coating layer or printing medium composition, a stage of coating at least one surface of the support body with the adjusted printing medium composition, and a stage of drying and hardening the printing medium composition used for the coating. In this way, the printing medium can be manufactured in a roll-to-roll manner, and the producibility of the printing medium can be improved. Furthermore, the thickness of the coating layer can be adjusted relatively easily, and therefore the printing medium can be manufactured with the desired traits, such as thinning the coating layer while maintaining the printing suitability.

The solvent may be water, may be an organic solvent such as methyl alcohol, ethyl alcohol, isopropyl alcohol, acetone, methyl ethyl ketone, ethyl acetate, toluene or xylene, or may be a mixed solvent including water and an organic solvent. The solvent is preferably water or has water as its primary component. In this way, the process management becomes easier. The solid concentration in the printing medium composition relative to the entire printing medium composition is preferably greater than or equal to 0.1% mass and more preferably greater than or equal to 3% mass. On the other hand, the solid concentration in the printing medium composition relative to the entire printing medium composition is preferably less than or equal to 20% mass and more preferably less than or equal to 15% mass.

The coating process may be performed together with the film formation in the formation processing line for the thermoplastic resin film, or may be performed on the formed film in a processing line that is separate from the processing line for forming the thermoplastic resin film. The coating of the printing medium composition on the support body can be performed using a coating apparatus such as a roll coater, blade coater, bar coater, air knife coater, size press coater, gravure coater, die coater, lip coater, or spray coater.

Before the coating layer is formed, the surface of the film layer including the thermoplastic resin may undergo surface oxidization processing. The surface oxidization process can be exemplified by a corona discharge process, a flame process, a plasma process, a glow discharge process, an ozone process, or a combination of these processes. In a case where the surface oxidization process is performed, the corona discharge process or flame process is preferably used. When performing the corona discharge process, the conditions are preferably greater than or equal to 600 J/m$^2$ (10 W·min/m$^2$) and more preferably greater than or equal to 1,200 J/m$^2$ (20 W·min/m$^2$). On the other hand, the conditions are preferably less than or equal to 12,000 J/m$^2$ (200 W·min/m$^2$) and more preferably less than or equal to 10,800 J/m$^2$ (180 W·min/m$^2$). When performing the flame process, the conditions are preferably greater than or equal to 8,000 J/m$^2$ and more preferably greater than or equal to 20,000 J/m$^2$. On the other hand, the conditions are preferably less than or equal to 200,000 J/m$^2$ and more preferably less than or equal to 100,000 J/m$^2$.

(Coating Amount)

In order to ensure that there is sufficient adhesion even when using UV-curable ink, which generally has poor adhesion, the coating amount in the coating layer, as a solid mass after drying on one surface, is preferably greater than or equal to 0.01 g/m$^2$, more preferably greater than or equal to 0.05 g/m$^2$, and even more preferably greater than or equal to 0.1 g/m$^2$. On the other hand, since it is relatively easy to adjust the coating process, the producibility of the printing medium can be improved, and uneven coating can be prevented, the coating amount is preferably less than or equal to 5 g/m$^2$, more preferably less than or equal to 3 g/m$^2$, and even more preferably less than or equal to 1 g/m$^2$.

(Coating Layer Thickness)

The thickness of the coating layer may be greater than or equal to 0.01 μm, is preferably greater than or equal to 0.05 μm, and is more preferably greater than or equal to 0.1 μm. On the other hand, the thickness of the coating layer may be less than or equal to 5 μm, is preferably less than or equal to 3 μm, and is more preferably less than or equal to 1 μm. In this way, it is possible to manufacture a printing medium with traits resembling those of existing printer paper.

The present embodiment describes a method in which the coating layer is formed by coating the printing medium composition on at least one surface of the support body. However, the method for forming the coating layer is not limited to this. Instead, the coating layer may be formed by forming a film that includes the printing medium composition in advance, and attaching this film to at least one surface of the support body. As another example, the printing medium composition may be converted into a pellet shape by removing the solvent.

EMBODIMENT EXAMPLES

The following provides a more detailed description of the present embodiment, by using embodiment examples and comparative examples. The following embodiment examples do not limit the present invention, which is defined by the Claims, and the types of material used, the distribution ratios of materials, the usage amount of materials, and the steps for manufacturing the printing medium can be changed as desired without deviating from the intent of the present invention. Table 1 shows the materials used for the embodiment examples and comparative examples.

TABLE 1

| TYPE | CODE | CONTENT |
|---|---|---|
| (a) CATIONIC URETHANE-BASED RESIN | CU1 | AQUEOUS POLYURETHANE DISPERSION (PRODUCT NAME: SUPERFLEX 650, MANUFACTURED BY DAI-ICHI KOGYO SEIYAKU CO., LTD., SOLID CONCENTRATION: 26 wt %, AVERAGE DISPERSED PARTICLE DIAMETER: 0.01 μm, MINIMUM FILM FORMING TEMPERATURE: 5° C. OR LESS) |
| | CU2 | CATIONIC AQUEOUS POLYURETHANE DISPERSION (PRODUCT NAME: HYDRAN CP-7050, MANUFACTURED BY DIC CORPORATION. SOLID CONCENTRATION: 25 wt %, AVERAGE DISPERSED PARTICLE DIAMETER: 0.08 μm, MINIMUM FILM FORMING TEMPERATURE 0° C.) |
| (b) OLEFIN COPOLYMER EMULSION | OE1 | ETHYLENE-METHACRYLIC ACID COPOLYMER EMULSION SOLUTION (PRODUCT NAME: AQUATEX AC-3100, MANUFACTURED BY JCR CO., LTD., AVERAGE DISPERSED PARTICLE DIAMETER: 0.7 μm, MINIMUM FILM FORMING TEMPERATURE: 100° C.) |
| | OE2 | POLYOLEFIN-BASED AQUEOUS DISPERSION (PRODUCT NAME: CHEMIPEARL S100, MANUFACTURED BY MITSUI CHEMICALS, INC., AVERAGE DISPERSED PARTICLE DIAMETER: 0.1 μm, MINIMUM FILM FORMING TEMPERATURE: 65° C.) |
| (c) ETHYLENEIMINE-BASED RESIN | EI1 | POLYETHYLENEIMINE (PRODUCT NAME EPOMIN P-1000, MANUFACTURED BY NIPPON SHOKUBAI CO., LTD.) |
| | EI2 | BUTYL-MODIFIED POLYETHYLENEIMINE (PRODUCT NAME: SAFTOMER AC-72, MANUFACTURED BY MITSUBISHI CHEMICAL CORPORATION) |
| (d) ANTISTATIC AGENT | AS | ACRYLIC-BASED RESIN CONTAINING QUATERNARY NITROGEN (PRODUCT NAME: SAFTOMER ST-3200, MANUFACTURED BY MITSUBISHI CHEMICAL CORPORATION) |
| (e) CROSS-LINKING AGENT | CL | EPICHLOROHYDRIN ADDITIVE OF POLYAMINE POLYAMIDE (PRODUCT NAME: WS-4082, MANUFACTURED BY SEIKO PMC CORPORATION) |

Support Body Manufacturing

Manufacturing Example 1

(1) An unstretched sheet was obtained by kneading, with an extruder set to a temperature of 270° C., a resin composition (A) obtained by mixing 81% mass of a propylene homopolymer (melting point of 164° C.) with an MFR (melt flow rate) of 0.8 g/10 min, 3% mass of high-density polyethylene, and 16% mass of heavy calcium carbonate with an average particle diameter of 1.5 μm, extruding the material obtained from the extruder into a sheet shape, and cooling the material in the sheet shape with a cooling apparatus. The obtained unstretched sheet was again heated to a temperature of 150° C. and then stretched to 5 times its length in the machine direction (MD direction) using the circumferential speed difference between rollers, thereby obtaining a 5-times longitudinally stretched film.

(2) Separately from the steps of (1) described above, a layered film with a three-layer structure was obtained by kneading, with two extruders set to a temperature of 270° C., the resin composition (B) obtained by mixing 55% mass of a propylene homopolymer (melting point of 164° C.) with an MFR of 4 g/10 min and 45% mass of heavy calcium carbonate with an average particle diameter of 1.5 μm, then extruding the materials obtained from the extruders into sheet shapes and subsequently laminating the two resin compositions (B) in sheet shapes obtained respectively from the two extruders onto respective surfaces of the 5-times longitudinally stretched film obtained from (1) described above.

(3) Next, the laminated film with the three-layer structure obtained from the process of (2) described above was cooled to a temperature of 60° C. and was then heated again to a temperature of 155° C. and stretched to 7.5 times its length in the transverse direction (TD direction) using a tenter oven. After this, a stretched layered film with a three-layer structure was obtained by performing an annealing process on the resulting film at a temperature of 165° C., cooling the film to a temperature of 60° C., and then cutting slits in the ear portions.

The stretched respective axis numbers of each layer (B layer/A layer/B layer) in the obtained layered stretched film having the three-layer structure were single axis stretching/biaxial stretching/single axis stretching. The overall thickness of the obtained layered stretched film was 80 μm, and the respective thicknesses of the layers were 15 μm/50 μm/15 μm. The density of the obtained layered stretched film having the three-layer structure was 0.79 g/cm$^3$ and the porosity was 29%. The opacity of the obtained layered stretched film having the three-layer structure was 90% and the whiteness was 95%.

(4) The corona discharge process was performed on one surface of the layered stretched film, using a corona discharge process apparatus (product name: HF 400F, manufactured by KASUGA Electric Works Ltd.). The corona discharge process was performed using an aluminum discharge electrode with a length of 0.8 m and a silicone coating roll for the treater roll. In the corona discharge process, the gap between the discharge electrode and the treater roll was set to 5 mm, the line processing speed was set to 15 m/min, and the printing energy density was set to 4,200 J/m$^2$.

Manufacturing the Printing Medium Composition

First Embodiment Example

The printing medium composition was obtained by adjusting an aqueous dispersion that includes 6% mass of (a) the cationic urethane-based resin as a solid, 6% mass of (b) the olefin copolymer emulsion as a solid, and 1% mass of (c) the ethyleneimine-based resin as a solid. An aqueous polyurethane dispersion (product name: Superflex 650, manufactured by DSK Co., Ltd.) was used as (a) the cationic urethane-based resin. An ethylene-methacrylic acid copolymer emulsion solution (product name: Aquatex AC-3100, manufactured by JCR Co., Ltd.) was used as (b) the olefin copolymer emulsion. Polyethyleneimine (product name: Epomin P-1000, manufactured by NIPPON SHOKUBAI Co., Ltd.) was used as (c) the ethyleneimine-based resin. The distribution ratio of each component in the printing medium composition represents the weight percentage of a solid relative to the entire printing medium composition.

Manufacturing the Printing Medium:

The adjusted printing medium composition was applied as a coating on the surface of the support body that underwent the corona discharge process, using the layered stretched film after the corona discharge process as the support body. The printing medium composition was applied as a coating such that the amount of coating per unit area (m$^2$) was 0.8 g as a solid after the drying. A bar coater was used for the coating. The support body coated with the printing medium composition was dried in an oven at 60° C. to form the coating layer, thereby obtaining the printing medium of the first embodiment example.

Second to Seventh Embodiment Examples and First to Eighth Comparative Examples

Printing mediums of the second to seventh embodiment examples and first to eighth comparative examples were obtained in the same manner as the first embodiment example, except that, for the respective coating layers in these examples, the printing medium composition applied to the one surface of the support body obtained from the first manufacturing example had its distribution ratios adjusted as shown in Table 2 and used the materials shown in Table 1, and the coating amount after drying (solid per unit area (m$^2$)) was as shown in Table 2. In Table 2, the distribution ratios of each of the components in the printing medium composition represent the solid concentration in the aqueous solution as a percentage of mass relative to the entire printing medium composition.

Ninth Comparative Example

The UV-curable inkjet printing resin film described as the first embodiment in Japanese Patent Application Publication No. 2011-131416 was used as the printing medium of the ninth comparative examples. Table 2 shows the distribution ratios of the printing medium compound used in the printing medium of the ninth comparative example, and the coating amounts of this composition.

TABLE 2

| | PRINTING MEDIUM COMPOSITION DISTRIBUTION RATIO (SOLID CONCENTRATION BY wt. % IN AQUEOUS DISPERSION) | | | | | | | | COATING AMOUNT |
|---|---|---|---|---|---|---|---|---|---|
| | (a) CATIONIC URETHANE-BASED RESIN | | (b) OLEFIN COPOLYMER EMULSION | | (c) ETHYLENEIMINE-BASED RESIN | | (d) ANTISTATIC AGENT | (e) CROSS-LINKING AGENT | DRIED SOLID CONTENT |
| | CU1 | CU2 | OE1 | OE2 | EI1 | EI2 | AS | CL | (g/m²) |
| EMBODIMENT EXAMPLE 1 | 6 | — | 6 | — | 1 | — | — | — | 0.8 |
| EMBODIMENT EXAMPLE 2 | — | 6 | 2 | — | 1 | — | — | — | 0.15 |
| EMBODIMENT EXAMPLE 3 | 4 | — | — | 9 | 1 | — | — | — | 0.15 |
| EMBODIMENT EXAMPLE 4 | — | 6 | — | 6 | — | 0.1 | 1 | — | 0.8 |
| EMBODIMENT EXAMPLE 5 | 6 | — | 6 | — | — | 2 | — | — | 0.8 |
| EMBODIMENT EXAMPLE 6 | — | 6 | 6 | — | — | 1 | 1 | — | 0.15 |
| EMBODIMENT EXAMPLE 7 | 6 | — | — | 6 | 1 | — | — | 1 | 0.15 |
| COMPARATIVE EXAMPLE 1 | — | 6 | — | 6 | — | — | — | — | 0.8 |
| COMPARATIVE EXAMPLE 2 | 6 | — | — | — | 1 | — | — | — | 0.8 |
| COMPARATIVE EXAMPLE 3 | — | — | 6 | — | — | 1 | 1 | 1 | 0.15 |
| COMPARATIVE EXAMPLE 4 | 6 | — | — | 6 | — | 1 | — | — | 0.005 |
| COMPARATIVE EXAMPLE 5 | — | 6 | — | 6 | — | 1 | — | — | 7 |
| COMPARTIVE EXAMPLE 6 | 6 | — | 6 | — | — | 4 | — | — | 0.1 |
| COMPARATIVE EXAMPLE 7 | — | 2 | 8 | — | — | 1 | — | — | 0.15 |
| COMPARATIVE EXAMPLE 8 | 11 | — | 1 | — | — | 2 | — | — | 0.15 |
| COMPARATIVE EXAMPLE 9 | — | — | — | — | 0.3 | — | — | — | 0.02 |

(Evaluation)

As an evaluation of a plate printing method, an evaluation of (1) plate printing suitability was performed for each of the printing mediums according to the first to seventh embodiment examples and the first to ninth comparative examples. Furthermore, as an evaluation of a plateless printing method, evaluations for each of (2) thermal transfer printing suitability, (3) inkjet printing suitability, and (4) electrophotographic printing suitability were performed. The evaluation results are shown in Table 3.

(1) Plate Printing Suitability (Evaluation of the Adhesion of UV-Curable Ink)

Prior to printing on the printing medium, the printing medium was adjusted by spending three days in an atmosphere with a temperature of 23° C. and 50% relative humidity. Solid printing was performed on the adjusted printing medium such that the ink amount on the surface of the coating layer of the printing medium was 1.5 g/m², by using a printer (product name: RI-3 printability tester, manufactured by Akira Seisakusho) and UV-curable printing ink (product name: Best cure 161 (Black), manufactured by T&K TOKA Corporation). The solid printing corresponds to an image portion in the plate printing. Next, the printing surface was irradiated with UV rays, to dry and harden the ink. The irradiation by the UV rays was performed using one UV lamp (a metal halide lamp with an output of 80 W/cm, manufactured by EYE GRAPHICS Co., Ltd.). The distance between the UV lamp and the printing medium was 10 cm. The printing medium was passed under the UV lamp once, at a speed of 10 m/min.

Cellophane tape (product name: Cellotape (registered trademark) CT-18, manufactured by NICHIBAN Co., Ltd.) was affixed with sufficient closeness to the printing surface of the printing medium, and then the cellophane tape was quickly peeled off. The state of the printing surface after the tape was peeled off was observed by eye, and the ink adhesion was evaluated. The evaluation standards for the ink adhesion are as shown below, with standards 3-5 indicating a pass.

| 5: Favorable | (There was absolutely no peeling of the ink.) |
| 4: Acceptable | (There was a small amount of peeling of the ink.) |
| 3: Acceptable | (No more than 25% of the ink was peeled off.) |
| 2: Unacceptable | (25-50% of the ink was peeled off.) |
| 1: Unacceptable | (At least 50% of the ink was peeled off.) |

(Antistatic Evaluation)

The printing medium was adjusted by spending two hours in an atmosphere with a temperature of 23° C. and relative humidity of 50%, and then the surface resistivity of the coating layer of the printing medium was measured using a megohmmeter (product name: DSM-8103 manufactured by TOA-DKK Corporation). In a case where the measured surface resistivity is less than or equal to $10^{12} \Omega/\square$, the feeding and delivery of paper during printing was favorable, and therefore it was determined that the antistatic property was favorable and the printing medium was suitable.

(2) Thermal Transfer Printing Suitability
(Ink Transition Evaluation)

Image printing on the printing medium was performed by printing the image of a CODE 39 barcode on the surface of the coating layer of the printing medium in an atmosphere with a temperature of 35° C. and relative humidity of 85%, using a barcode printer (product name: B-30-S5, manufactured by Tec Co., Ltd.) and a molten resin ink ribbon (product name: B110C, manufactured by Ricoh Company, Ltd.).

The ink transition evaluation was performed by measuring the ANSI grade of the barcode printed on the printing medium, by using a barcode verification device (product name: LASERCHECK II, manufactured by Fuji Electric Refrigerator Co., Ltd.). The standards for the ink transfer evaluation are as shown below, where an ANSI grade of A-C indicates a pass.
Favorable: ANSI grade of A or B (A vivid image is obtained.)
Acceptable: ANSI grade of C (The barcode is slightly blurred, but can still be used.)
Unfavorable: ANSI grade of D-F (The blurring in the barcode causes line breaks.)
Unacceptable: ANSI grade of N/G (The CODE 39 barcode cannot be recognized.)

(Ink Adhesion Evaluation)

Image printing on the printing medium was performed by printing the image of a CODE 39 barcode on the surface of the coating layer of the printing medium in an atmosphere with a temperature of 23° C. and relative humidity of 50%, using the same printer and ink ribbon as in the ink transition evaluation. The ANSI grade of the barcode immediately after printing was grade A in each case, indicating favorable printing.

Next, the printing medium with the CODE 39 barcode printed thereon was adjusted by spending at least two hours in an atmosphere with a temperature of 35° C. and relative humidity of 85%. After this, cellophane tape (product name: Cellotape (registered trademark) CT-18, manufactured by NICHIBAN Co., Ltd.) was affixed with sufficient closeness to the barcode, and then the cellophane tape was quickly peeled off. The ink adhesion was evaluated by measuring the ANSI grade of the barcode after the tape was peeled off. The standards for the ink adhesion evaluation are as shown below, where ANSI grades of A-C indicate a pass.
Favorable: ANSI grade of A or B (Ink adhesion is good and the ink does not fall away.)
Acceptable: ANSI grade of C (The barcode is slightly blurred, but can still be used.)
Unfavorable: ANSI grade of D-F (The blurring in the barcode causes line breaks.)
Unacceptable: ANSI grade of N/G (The ink falls away to the point where the barcode is unrecognizable.)

(3) Inkjet Printing Suitability
(Printing Quality Evaluation)

Prior to printing on the printing medium, the printing medium was adjusted by spending three days in an atmosphere with a temperature of 23° C. and relative humidity of 50%. After this, 100% solid printing and character printing were performed on the surface of the coating layer of the printing medium, using a UV-curable inkjet printing device (product name: OceArizona 250GT, manufactured by Oce) and UV-curable inkjet printing ink (black) that is pure ink for the "OceArizona 250GT."

The printing quality was evaluated by observing the characters after printing by eye. The evaluation was based on the bleeding of the ink. The standards for the printing quality evaluation are as shown below, with standards 3 and 4 indicating a pass.

| | |
|---|---|
| 4: Favorable | (No ink bleeding was observed.) |
| 3: Acceptable | (A small amount of ink bleeding was observed.) |
| 2: Unacceptable | (Ink bleeding was observed.) |
| 1: Unacceptable | (A large amount of ink bleeding was observed.) |

(Water Resistant Adhesion Evaluation)

The printing medium that was printed on in the manner described above was submerged for 24 hours in water with a temperature of 23° C. The moisture in the surface of the printing medium after being removed from the water was gently removed with a cloth, and then cellophane tape (product name: Cellotape (registered trademark) CT-18, manufactured by NICHIBAN Co., Ltd.) was affixed with sufficient closeness to the printing surface of the printing medium, after which the cellophane tape was quickly removed. The ink adhesion was evaluated by observing the state of the printing surface after the tape was peeled off by eye. The standards for the ink adhesion evaluation are as shown below, with standards 3-5 indicating a pass.

| | |
|---|---|
| 5: Favorable | (There was absolutely no peeling of the ink.) |
| 4: Acceptable | (There was a small amount of peeling of the ink.) |
| 3: Acceptable | (No more than 25% of the ink was peeled off.) |
| 2: Unacceptable | (25-50% of the ink was peeled off.) |
| 1: Unacceptable | (At least 50% of the ink was peeled off.) |

(4) Electrophotographic Printing Suitability
(Toner Adhesion Evaluation)

Prior to printing on the printing medium, the printing medium was adjusted by spending three days in an atmosphere with a temperature of 23° C. and 50% relative humidity. After this, 100% black solid printing was performed on the surface of the coating layer of the adjusted printing medium, using a laser printer (product name: Magicolor 745011, manufactured by Konica Minolta, Inc.).

Next, cellophane tape (product name: Cellotape (registered trademark) CT-18, manufactured by NICHIBAN Co., Ltd.) was affixed with sufficient closeness to the printing surface of the printing medium, after which the cellophane tape was quickly removed. The toner adhesion was evaluated by observing the state of the printing surface after the tape was peeled off by eye. The standards for the toner adhesion evaluation are as shown below, with standards 3-5 indicating a pass.

| | |
|---|---|
| 5: Favorable | (There was absolutely no peeling of the toner.) |
| 4: Acceptable | (There was a small amount of peeling of the toner.) |
| 3: Acceptable | (No more than 25% of the toner was peeled off.) |
| 2: Unacceptable | (25-50% of the toner was peeled off.) |
| 1: Unacceptable | (At least 50% of the toner was peeled off.) |

(Water Resistant Adhesion Evaluation)

The printing medium that was printed on in the manner described above was submerged for 24 hours in water with a temperature of 23° C. The moisture in the surface of the printing medium after being removed from the water was gently removed with a cloth, and then cellophane tape (product name: Cellotape (registered trademark) CT-18, manufactured by NICHIBAN Co., Ltd.) was affixed with sufficient closeness to the printing surface of the printing medium, after which the cellophane tape was quickly removed. The ink adhesion was evaluated by observing the state of the printing surface after the tape was peeled off by eye. The standards for the ink adhesion evaluation are as shown below, with standards 3-5 indicating a pass.

| | |
|---|---|
| 5: Favorable | (There was absolutely no peeling of the toner.) |
| 4: Acceptable | (There was a small amount of peeling of the toner.) |
| 3: Acceptable | (No more than 25% of the toner was peeled off.) |
| 2: Unacceptable | (25-50% of the toner was peeled off.) |
| 1: Unacceptable | (At least 50% of the toner was peeled off.) | suitability for inkjet printing using UV-curable ink and for plate printing using UV-curable ink, which usually suffer from low adhesion to the film. On the other hand, it is understood that the printing mediums of the first to ninth comparative examples are inferior to the printing mediums of the first to seventh embodiment examples with respect to each of thermal transfer printing suitability, plate printing suitability, inkjet printing suitability, and electrophotographic printing suitability.

Among the embodiment examples described above, more favorable effects were realized for the first and fifth to seventh embodiment examples, in which the distribution

TABLE 3

| | (1) PLATE PRINTING SUITABILITY | | | (2) THERMAL TRANSFER PRINTING SUITABILITY | | (3) INKJET PRINTING SUITABILITY | | (4) ELECTRO-PHOTOGRAPHIC PRINTING SUITABILITY | |
|---|---|---|---|---|---|---|---|---|---|
| | INK ADHESION | ANTISTATIC PROPERTY | PAPER POWDER EVALUATION | INK TRANSITION | INK ADHESION | PRINTED QUALITY | WATER RESISTANT ADHESION | TONER ADHESION | WATER RESISTANT ADHESION |
| EMODIMENT EXAMPLE 1 | 5 | ≤10E12Ω | ◎ | A | A | 4 | 4 | 5 | 4 |
| EMODIMENT EXAMPLE 2 | 5 | ≤10E12Ω | ◎ | B | B | 3 | 4 | 3 | 3 |
| EMODIMENT EXAMPLE 3 | 4 | ≤10E12Ω | ○ | A | A | 3 | 3 | 4 | 4 |
| EMODIMENT EXAMPLE 4 | 4 | ≤10E12Ω | ◎ | A | A | 4 | 4 | 4 | 4 |
| EMODIMENT EXAMPLE 5 | 5 | ≤10E12Ω | ◎ | A | A | 4 | 5 | 5 | 5 |
| EMODIMENT EXAMPLE 6 | 5 | ≤10E12Ω | ◎ | A | A | 4 | 5 | 5 | 5 |
| EMODIMENT EXAMPLE 7 | 4 | ≤10E12Ω | ◎ | A | A | 4 | 5 | 5 | 5 |
| COMPARATIVE EXAMPLE 1 | 3 | >10E12Ω | ◎ | A | A | 3 | 2 | 4 | 4 |
| COMPARATIVE EXAMPLE 2 | 4 | ≤10E12Ω | ◎ | C | D | 3 | 3 | 4 | 4 |
| COMPARATIVE EXAMPLE 3 | 4 | ≤10E12Ω | Δ | D | D | 2 | 2 | 3 | 3 |
| COMPARATIVE EXAMPLE 4 | 2 | >10E12Ω | Δ | E | E | 3 | 2 | 2 | 2 |
| COMPARATIVE EXAMPLE 5 | 5 | ≤10E12Ω | ◎ | A | A | 2 | 5 | 5 | 5 |
| COMPARATIVE EXAMPLE 6 | 5 | ≤10E12Ω | ◎ | A | A | 4 | 2 | 5 | 2 |
| COMPARATIVE EXAMPLE 7 | 5 | ≤10E12Ω | ◎ | A | A | 2 | 2 | 4 | 4 |
| COMPARATIVE EXAMPLE 8 | 5 | ≤10E12Ω | ◎ | B | D | 4 | 5 | 3 | 2 |
| COMPARATIVE EXAMPLE 9 | 4 | >10E12Ω | X | F | F | 2 | 1 | 1 | 1 |

As made clear by Table 3, the printing mediums of the first to seventh embodiment examples, which include (a) the cationic urethane-based resin, (b) the olefin copolymer emulsion, and (c) the ethyleneimine-based resin all pass each of the standards for (1) plate printing suitability, (2) thermal transfer printing suitability, (3) inkjet printing suitability, and (4) electrophotographic printing suitability, and therefore exhibit excellent printing suitability for both plate printing methods and plateless printing methods. In particular, it is understood that the printing mediums of the first to seventh embodiment examples also have excellent printing ratio of the printing medium composition is such that the content of (b) the olefin copolymer emulsion is greater than or equal to 50 pts. mass and less than or equal to 180 pts. mass and the content of (c) the ethyleneimine-based resin is greater than or equal to 10 pts. mass and less than or equal to 50 pts. mass.

INDUSTRIAL APPLICABILITY

The printing medium composition and printing medium according to the present embodiment are suitable for a plurality of printing methods. Furthermore, with one embodiment, the printing medium composition and printing medium can be adapted not only for plate printing methods such as offset printing and seal printing, but also for plateless printing methods such as thermal transfer printing, electrophotographic printing, and inkjet printing.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A printing medium composition comprising (a) a cationic urethane-based resin, (b) 10-400 pts. mass of an olefin copolymer emulsion, and (c) 1-60 pts. mass of an ethyleneimine-based resin, relative to 100 pts. mass of (a) the cationic urethane-based resin.

2. A printing medium comprising:
a coating layer that is provided on at least one surface of a support body and includes a printing medium composition comprising (a) a cationic urethane-based resin, (b) an olefin copolymer emulsion, and (c) an ethyleneimine-based resin, wherein
solid mass of the coating layer on one surface is greater than or equal to 0.01 g/m$^2$ and less than 5 g/m$^2$.

3. The printing medium according to claim 2, wherein the coating layer further includes (d) an antistatic agent.

4. The printing medium according to claim 3, wherein (d) the antistatic agent includes at least one of an acrylic resin containing ternary nitrogen and an acrylic resin containing quaternary nitrogen.

5. The printing medium according to claim 2, wherein the coating layer further includes (e) a cross-linking agent.

6. The printing medium according to claim 5, wherein (e) the cross-linking agent includes an epichlorohydrin additive of polyamine polyamide.

7. The printing medium according to claim 2, wherein the support body is a film layer including a thermoplastic resin.

8. The printing medium according to claim 7, wherein the thermoplastic resin includes a polyolefin-based resin.

9. The printing medium according to claim 7, wherein the film layer including the thermoplastic resin further includes at least one of inorganic particles and an organic filler.

10. The printing medium according to claim 9, wherein the inorganic particles include calcium carbonate with an average particle diameter of 0.01-15 μm.

11. The printing medium according to claim 7, wherein the film layer including the thermoplastic resin is stretched in a direction of at least one axis.

* * * * *